June 24, 1930.　　A. J. PFAFF ET AL　　1,767,153

LUBRICATING DEVICE

Filed Sept. 22, 1927

Inventors:
Andrew J. Pfaff,
John A. Irig,
Charles J. Sinning,
by Rippey & Kingsland
Their Attorneys.

Patented June 24, 1930

1,767,153

UNITED STATES PATENT OFFICE

ANDREW J. PFAFF, OF ST. LOUIS, AND JOHN A. DRIY AND CHARLES J. SINNING, OF WEBSTER GROVES, MISSOURI, ASSIGNORS TO THE EMERSON ELECTRIC MFG. CO., OF ST. LOUIS, MISSOURI, A CORPORATION OF MISSOURI

LUBRICATING DEVICE

Application filed September 22, 1927. Serial No. 221,315.

This invention relates to improvements in lubricating devices, and consists in the novel construction hereinafter disclosed.

Primarily, the object of the invention is to provide a construction particularly adapted for incorporation in an oscillating fan, whereby the mounting for the armature core is lubricated by causing the lubricant to circulate across the bearing of the armature core, and to be returned by means of a construction which includes as an element the drive shaft for the oscillating mechanism.

Generally, the invention consists in improvements in lubricating devices that have general application, and the objects of the invention in its broader aspect are to simplify and improve lubricating devices in which there is a rotating member mounted on a hollow shaft, with provision for causing the lubricant to circulate across the bearing of the rotating member and to return through the hollow shaft.

The advantages of the construction will be readily apparent from the following detailed description thereof, taken in connection with the accompanying drawing, in which Fig. 1 is a longitudinal section through the construction.

Figure 1:
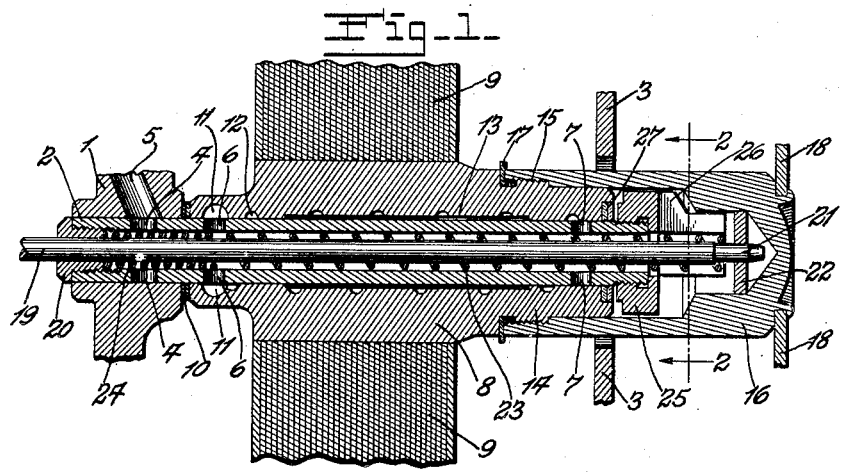
Figure 2:
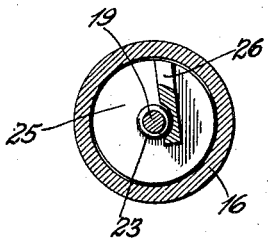
Fig. 2 is a cross section on the line 2—2 of Fig. 1.

In the drawing the invention is shown as embodied in a fan construction of the oscillating type. As illustrated, the construction includes a support 1, shown in the drawing as a portion of the end plate of the oscillating mechanism housing. It will be understood that, in an oscillating fan construction, the oscillating mechanism housing, of which the end plate forms a part, is connected with the motor housing which, in turn, is supported by a base or bracket. The end plate of the oscillating mechanism housing, therefore, provides a convenient support into which is fitted a tubular shaft 2, and said shaft extends forwardly in the fan construction through the axis of the motor housing, the front wall of which is indicated at 3. This shaft 2 has, at its inner end, a drive fit in an opening in a boss of the end plate 1, and, therefore, is non-rotatable. It is provided with a pair of oppositely disposed openings 4 located within the opening in the boss of the end plate 1, and a lubricant conduit 5 extends through the end plate and registers with the upper end of the openings 4. It will be understood that the lubricant conduit may be provided, at its upper end, with an oil cup for the introduction of the lubricant. The said shaft 2 is also provided with additional pairs of openings numbered respectively 6 and 7. Said openings 6 are spaced a short distance forwardly of the openings 4, and beyond the front face of the plate 1. The openings 7 are disposed near the forward end of the shaft 2.

An armature core 8 is fitted over the shaft 2, an armature 9 being carried by a central enlarged portion of the armature core 8. In mounting the armature core on the shaft 2, a pair of washers 10 are preferably interposed between the inner end of the core, and the face of the boss on the plate 1 to take the thrust and reduce the end play of the armature when rotated.

The inner surface of the hub of the armature core has a channel 11 cut therein, which channel registers with the openings 6 of the shaft 2. The bore through the armature core is also provided with a spiral groove 12 that extends from the channel 11 forwardly to the front end of the armature core 8. The bore of the armature core is also formed so that its central portion has a diameter slightly in excess of the end portions thereof, providing a relieved section 13 to reduce the friction between the bore of the armature core and the shaft 2, permitting the core to have bearing with the shaft 2 at its end sections only.

The construction is such that the lubricant introduced through the conduit 5 is forced forwardly from the openings 4 through the hollow bore of the shaft 2 and outwardly through the openings 6 into the channel 11.

The groove 12 is so developed that it receives and advances toward the forward end of the construction the body of lubricant admitted to the groove 12 from the channel 11.

The forward end of the armature core 8 is in the form of a circular hub 14 and a screw section 15. A fan hub 16 in the form of a closed hollow cap is screwed onto the threaded portion 15 of the hub 14, and a tight joint is effected by interposing a gasket or washer 17 between the end of the member 16 and a shoulder formed on the armature core at the base of the hub section 14 thereof. The internal portion of the fan hub 16 constitutes a well into which the lubricant is forced from the spiral groove 12.

It is noted that the fan blades, sections of which are shown at 18, are carried by the hub 16. It is also noted that it is preferred that the screw connection between the hub 16 and the threaded portion 15 is a screw connection opposite to the direction of rotation of the fan to prevent the fan hub from loosening from the armature core.

A shaft 19 extends through the bore of the shaft 2 and its inner section is supported in a bushing 20 that threads into the inner end of the shaft 2. The shaft 19 extends backwardly through the end plate 1 and is the actuating shaft for the oscillating mechanism. The forward end of said shaft 19 has a flattened portion 21 that fits into a rectangular opening in a plate 22 supported near the base of the recess in the hub 16. Therefore, it is obvious that the shaft 19 will rotate with the fan hub.

Figure 3:
Fig. 3 is a detail view of the coil spring utilized as a return conveyor for the lubricant.

A return conveyor for the lubricant in the form of a spirally wound wire, the form of which is particularly shown in Fig. 3, is mounted over the shaft 19. By reference to Fig. 3 it will be noted that the front section 23 of the spring has relatively wide spaces between the spirals, and that the spirals are developed to convey the lubricant from the forward end of the shaft towards the rear end thereof to a point, when assembled, that approximately registers with the openings 6. The rear section 24 of the spring is reversely wound, and the spirals are more closely developed. The action of this construction is to convey the lubricant forced into the well formed by the recess in the hub 16 backwardly to a point where it is moved outwardly through the openings 6 and into the groove 11. Any lubricant that passes beyond the openings 6 is moved outwardly toward said openings by the spiral section 24 of the spring. Thus, the lubricant is prevented from working out from the end of the shaft 2. It should be noted that the spring is so connected with the shaft 19 that it rotates therewith.

In order to prevent the accumulation of the lubricant around the walls of the well formed by the recess in the hub 16, a wiper is provided, which wiper includes a hub 25 and a wing or blade 26, the edge of which is beveled to lie adjacent to the wall of the recess in the member 16. The wiper is mounted on the end of the shaft 2 by screwing the hub thereof on the threaded end of said shaft. The wiper, therefore, remains stationary and the hub 16 revolves about said wiper, thereby causing the accumulated layer or film of lubricant to be wiped from the wall of the recess in the member 16 and carried toward the center of the recess in the hub 16, where it is caught up by the spiral conveyor, and then moved rearwardly. The hub of the wiper also serves as a retaining nut to hold the armature core in assembled relation with its supporting shaft 2.

It will be noted that, since the forward end of the armature core lies adjacent to the stationary wiper hub and, since there is a relative rotary motion between these elements, washers 27 are preferably interposed between the inner face of the wiper hub and the end of the armature core, said washers being preferably set in a recess in the end of said armature core.

From the foregoing it will be noted that an extremely efficient lubricant circulating device has been provided, and that the parts are so assembled that there will be practically no loss of the lubricant, but that it will continue to circulate across the bearing surfaces in such a manner as to obtain the full lubricating effect thereof.

We are aware that the invention may be modified in numerous particulars and that its applicability may extend to other constructions than the specific embodiment illustrated and described. We do not limit ourselves, therefore, to the exact construction shown and described, but what we claim and desire to secure by Letters Patent is:—

1. A device of the class described comprising a hollow shaft, a revoluble member mounted on said shaft, means forming a lubricating conduit communicating with said shaft, means for moving the lubricant along the exterior of said shaft in one direction, and a conveyor for returning the lubricant through the bore of said shaft.

2. A device of the class described comprising a hollow stationary shaft, a member revolubly mounted on said shaft, said member having a spiral groove in its bore adjacent to said shaft for moving a lubricant along the surface thereof, means forming a lubricant supply conduit in communication with said shaft, and a conveyor for returning the lubricant through the bore of said shaft.

3. A device of the class described comprising a hollow stationary shaft, a member revolubly mounted on said shaft, said member having a spiral groove in its bore adjacent to said shaft for moving a lubricant along the surface thereof, means forming a lubricant supply conduit in communication with said shaft, and a spiral conveyor mounted within the bore of said shaft for returning the lubricant therethrough.

4. A device of the class described comprising a hollow shaft having spaced openings through the wall thereof, means for admitting lubricant from an external source to one of said openings, a member revolubly mounted on said shaft, means for moving the lubricant along said shaft comprising a spiral groove between the shaft and the revoluble member, and means for returning the lubricant through the bore of said shaft, said means comprising an internal revoluble shaft and a spiral conveyor mounted on said internal shaft.

5. In a device of the class described, the combination of a hollow shaft having a plurality of spaced openings through the wall thereof, a member revolubly mounted on said shaft, said member having a lubricant receiving channel and a spiral groove communicating therewith, a lubricant supply conduit, an internal shaft mounted within said hollow shaft, said internal shaft being revoluble with said revoluble member, a spirally wound wire carried by said internal shaft having a section of spirals for conveying the lubricant rearwardly of said shaft, and a section conveying the lubricant forwardly of said shaft, and a cap forming a well at the end of said revoluble member and said shaft.

6. In a device of the class described, the combination of a hollow shaft having a plurality of spaced openings through the wall thereof, a member revolubly mounted on said shaft, said member having a lubricant receiving channel and a spiral groove communicating therewith, a lubricant supply conduit, an internal shaft mounted within said hollow shaft, said internal shaft being revoluble with said revoluble member, a spirally wound wire carried by said internal shaft having a section of spirals for conveying the lubricant rearwardly of said shaft, and a section conveying the lubricant forwardly of said shaft, a cap forming a well at the end of said revoluble member and said shaft, and a wiper device carried by said shaft for removing the lubricant from the wall of said well.

7. In an oscillating fan mechanism, a lubricating device comprising a hollow shaft supported by the fan structure, an armature core revolubly mounted on said shaft, said armature core having a lubricant receiving channel and a spiral groove communicating therewith, a drive shaft for the oscillating mechanism located within said hollow shaft, a spiral conveyor carried by said drive shaft, and means for admitting a lubricant to the internal and external surfaces of said hollow shaft.

8. In an oscillating fan mechanism, a lubricating device comprising a stationary hollow shaft having a plurality of spaced passages through the wall thereof, a lubricant inlet conduit communicating through selected ones of said passages with the bore of said shaft, an armature core having lubricant receiving grooves for receiving and advancing the lubricant across the bearing surfaces of said core, and means for causing the return circulation of the lubricant through the bore of said hollow shaft.

9. In an oscillating fan mechanism, a lubricating device comprising a stationary hollow shaft having a plurality of spaced passages through the wall thereof, a lubricant inlet conduit communicating through selected ones of said passages with the bore of said shaft, an armature core having lubricant receiving grooves for receiving and advancing the lubricant across the bearing surfaces of said core, means for causing the return circulation of the lubricant through the bore of said hollow shaft, said means including an internal shaft disposed within said hollow shaft, and a spirally wound conveyor supported by and rotating with said shaft.

10. In an oscillating fan mechanism, a lubricating device comprising a stationary hollow shaft having a plurality of spaced passages through the wall thereof, a lubricant inlet conduit communicating through selected ones of said passages with the bore of said shaft, an armature core having lubricant receiving grooves for receiving and advancing the lubricant across the bearing surfaces of said core, and means for causing the return circulation of the lubricant through the bore of said hollow shaft, said means including an internal shaft disposed within said hollow shaft, and a spirally wound conveyor having oppositely disposed spirals for returning the lubricant to the lubricant receiving grooves in said armature core.

11. In an oscillating fan construction, a lubricating device comprising a hollow shaft, an armature core revolubly supported by said shaft, a fan hub connected with said armature core having an internal recess therein, means for admitting lubricant to the space between the armature core and said shaft and for advancing said lubricant along said space into said fan hub, a wiper device for removing the lubricant from the walls of the recess in said fan hub, and means for returning the lubricant through the bore of said hollow shaft.

12. In a device of the class described, the combination of a hollow shaft having an opening through the wall thereof adapted to allow the passage of lubricant, a member revolubly mounted on said shaft, an internal shaft mounted within said hollow shaft, said internal shaft being revoluble with said revoluble member, and a spirally wound wire carried by said internal shaft having a section of spirals wound in one direction forward of said opening in the shaft wall and wound in the opposite direction rearwardly of said opening.

13. In a device of the class described, the combination of a hollow shaft having a plurality of spaced openings through the wall thereof, a member revolubly mounted on said shaft, said member having a lubricant receiving channel registering with one of said openings and a spiral groove communicating with said channel, a lubricant supply conduit in communication with another of said openings, an internal shaft mounted within said hollow shaft and revoluble with said member, a spirally wound wire carried by said internal shaft having a section of spirals for conveying the lubricant forward from the lubricant supply conduit to the opening communicating with the lubricant receiving channel and another section reversely wound for conveying the lubricant rearwardly to the opening communicating with the lubricant receiving channel, and means of communication between the forward end of the spiral groove and the hollow shaft.

ANDREW J. PFAFF.
JOHN A. DRIY.
CHARLES J. SINNING.